United States Patent
Seidel et al.

(10) Patent No.: US 8,601,851 B2
(45) Date of Patent: Dec. 10, 2013

(54) METHOD AND FINISHING TRAIN FOR HOT-ROLLING STARTING MATERIAL

(75) Inventors: Jürgen Seidel, Kreuztal (DE); Matthias Peters, Kreuztal (DE)

(73) Assignee: SMS Siemag Aktiengesellschaft, Düsseldorf (DE)

( * ) Notice: Subject to any disclaimer, the term of this patent is extended or adjusted under 35 U.S.C. 154(b) by 1044 days.

(21) Appl. No.: 12/084,366

(22) PCT Filed: Oct. 16, 2006

(86) PCT No.: PCT/EP2006/009954
§ 371 (c)(1),
(2), (4) Date: Aug. 31, 2009

(87) PCT Pub. No.: WO2007/051521
PCT Pub. Date: May 10, 2007

(65) Prior Publication Data
US 2009/0320546 A1    Dec. 31, 2009

(30) Foreign Application Priority Data

Oct. 31, 2005 (DE) .......................... 10 2005 052 375
Jan. 19, 2006 (DE) .......................... 10 2006 002 505

(51) Int. Cl.
*B21D 31/00* (2006.01)

(52) U.S. Cl.
USPC .............................................. 72/364; 72/200

(58) Field of Classification Search
USPC .................................. 72/187, 200, 202, 364
See application file for complete search history.

(56) References Cited

U.S. PATENT DOCUMENTS

| 5,133,205 A |   | 7/1992 | Rostik et al. |
| 5,990,464 A | * | 11/1999 | Hino et al. ...................... 72/202 |

FOREIGN PATENT DOCUMENTS

| DE | 44 02 402 | 8/1995 |
| EP | 0 415 987 | 12/1992 |
| EP | 0 738 547 | 10/1996 |
| EP | 0 771 596 | 5/1997 |

(Continued)

OTHER PUBLICATIONS

Database WPI, Section CH, Week 8049, Derwent Publications Ltd, London, GB Class M, p. 21, XP002472793 & SU728955A, Filatov, May 1, 1980.

*Primary Examiner* — Teresa M Ekiert
(74) *Attorney, Agent, or Firm* — Lucas & Mercanti, LLP; Klaus P. Stoffel

(57) ABSTRACT

The invention relates to a method and a finishing train for hot-rolling starting material. Starting material is finished in several successive roll stands (110 n) in the finishing train, the material cooling off because of heat loss. The material has to be reheated in order for the temperature of the material not to drop below the predefined lower threshold temperature value at low speeds within and at the discharge end of the finishing train. In order to use as little energy as possible for said reheating process, the reheating process within the finishing train is carried out for the first time only when the temperature of the material risks falling below the lower threshold temperature value for the first time relative to the direction of flow of the material because of heat loss. Furthermore, the temperature of the material during the reheating process is increased only to the point where the temperature of the material will not drop below the lower threshold temperature value ($T_U$) while the material is conveyed onto a next heating device that is mounted downstream in the direction of flow of the material and until the material is discharged from the mill train.

15 Claims, 7 Drawing Sheets

(56) References Cited

FOREIGN PATENT DOCUMENTS

| | | |
|---|---|---|
| EP | 0 889 762 | 10/1999 |
| JP | 57 085 601 | 5/1982 |
| JP | 03 042 101 | 2/1991 |
| JP | 2000061505 | 2/2000 |
| WO | 89/11363 | 11/1989 |
| WO | 97/07905 | 3/1997 |

* cited by examiner

METHOD AND FINISHING TRAIN FOR HOT-ROLLING STARTING MATERIAL

The invention concerns a method and a finishing train for hot rolling starting material, especially thin slabs or near-net strip.

A method of this type and a corresponding finishing train are known in the prior art, e.g., as disclosed in European patent EP 0 415 987 B2. This patent describes a finishing train that consists of several successive rolling stands. The rolling stands are used to hot roll starting material to strip material, which at the beginning is heated to a run-in temperature that is greater than the desired final rolling temperature at the end of the finishing train. The material cools due to heat losses as it passes through the finishing train. Inductive heaters are provided within the finishing train to compensate the heat losses by reheating the material to the extent that the desired final rolling temperature of the strip material as it leaves the rolling train does not fall below a predetermined lower threshold value.

The cited European patent provides no detailed information about the criteria that are to be applied to determine how much the material is to be reheated within the finishing train by the inductive heaters. The procedure described there is not energetically optimal.

Therefore, proceeding from this prior art, the objective of the present invention is to modify a previously known method for the hot finish rolling of starting material and a corresponding, previously known finishing train in such a way that the energy supplied to the material within the finishing train to obtain a desired final rolling temperature when the material leaves the finishing train is reduced to a minimum.

This objective is achieved by the method claimed in Claim 1. This method is characterized in that, as seen in the direction of material flow, first a determination is made of that heater at which or downstream of which the temperature of the material threatens to fall below the lower temperature threshold value for the first time due to heat losses; in that the reheating of the material is then carried out in such a way that the temperature of the material is increased by means of the heater thus determined only to the extent that the temperature falls only to the lower temperature threshold value due to the given local heat losses in the finishing train during the further conveyance of the material to the next heater downstream, as seen in the direction of material flow, or, if there is no further heater downstream in the direction of material flow, to the point at which the material leaves the finishing train; and in that the reheating of the material is repeated by each additional downstream heater within the finishing train, as viewed in the direction of material flow.

The claimed procedure has the advantage that the temperature level and the temperature fluctuations of the material within the finishing train are kept small, and in this way the amount of thermal energy required to reheat the material within the finishing train and the necessary costs associated with supplying this energy are reduced to a minimum. The claimed manner of reheating results in only moderate temperature increases and overall relatively low temperatures in the entire finishing train, and this is also an advantage where the surface quality is concerned. Compared to heating the starting material before it enters the finishing train to a run-in temperature that is sufficiently high that the temperature of the material does not fall below the desired final rolling temperature due to the heat losses it experiences as it passes through the entire finishing train, the necessary heat input in the method of the invention is significantly lower.

In accordance with one embodiment of the invention, during the reheating, the material is not reheated above a predetermined upper temperature threshold value, so that its temperature after the first reheating within the finishing train until it leaves the finishing train always remains at least essentially within a target temperature range that is defined by the upper and lower temperature threshold values. In this target temperature range, quasi-isothermal rolling takes place with regular reheating of the material.

The target temperature range for a specific material that is being used (e.g., ULC steel or IF steel) is selected in such a way that the curve of the hot flow strength of the material over temperature has a local minimum in the target temperature range. This has the advantage that the material that is being used then shows especially good deformability in the target temperature range, which can be utilized to reduce wear and tear on the rolling train (rolling stands, motors, etc.) and to reduce the minimum final thickness. Ferritic rolling is involved here.

With respect to a good rolling result, especially good material properties and good surface quality, it is advantageous to predetermine the lower temperature threshold value as a function of the material.

In certain slab or strip plants, it may be necessary, before the starting material enters the finishing train, to heat it by means of an additional preheater to a run-in temperature above the lower temperature threshold value. This can be necessary when the temperature of the material as it leaves the furnace or a casting installation is especially low or when the casting speed and/or the distance between a strand guide system and the finishing train is especially great, and the material would then cool to a run-in temperature below the lower temperature threshold value by the time it enters the finishing train. In these cases, the preheater serves the purpose of at least partially compensating these heat losses before entrance into the finishing train. Alternatively or additionally, the preheater can also be used to prevent the temperature of the material from falling below the lower threshold value in the run-in region of the finishing train when descaling units or cooling units between rolling stands are provided for the purpose of realizing a desired good surface quality, since these units can bring about especially strong cooling of the material.

It is advantageous for the amounts of heat to be transferred to the material passing through the finishing train by the individual heaters installed between the rolling stands of the finishing train to be individually predetermined for each of the heaters by means of a computer model. This predetermination is made on the basis of known heat losses that occur especially during the conveyance of the material between successive rolling stands or between successive heaters and during the passage of the material through the individual rolling stands. It is advantageous for the computer model to consider material-related, mechanical, or electronic limitations predetermined by the manufacturer for the rolling mills of the finishing train and for the heaters as well as permissible ranges for the rolling process. To stay within these predetermined limitations, the computer model evaluates numerous process parameters.

The computer model can be designed to make an iterative computation of the amounts of heat to be transferred to the material by each individual heater either on the basis of a forward computation in the direction of material flow or a backward computation opposite the direction of material flow, which starts from the desired final rolling temperature of the strip material at the exit of the finishing train.

The computation of the amounts of heat to be produced and transferred to the material is basically carried out in the preliminary stages of a finish rolling process.

However, it is advantageous for the computer model also to be designed to use of self-adaptation to take into account changes in process parameters that are recognized during a finish rolling process.

The lateral edges of the starting material are typically exposed as soon as the material leaves a casting mold and in this respect act as heat-radiating surfaces. In addition, the entire amount of cooling water that is applied, for example, to the broad surface of the starting material during a descaling operation, runs down along the edges, which thus experience additional strong cooling. As a result, therefore, the starting material is typically more strongly cooled at its edges than in the center before it enters the finishing train. However, it is desired that, as far as possible, the material be uniformly heated throughout, including transversely to the direction of material flow, no later than when it is leaving the finishing train. In order to achieve this goal, the present invention proposes that the heaters for reheating the material within the finishing train be positioned with orientation towards the strip edge and that they be controlled by the computer model in such a way that the overcooled edges of the material are more strongly heated than the center of the material, so that the material is uniformly heated, even in the transverse direction, no later than when it is leaving the finishing train.

In practice, it has been found to be effective to carry out the reheating with inductive heaters, because inductive heaters in contrast to, for example, burners, allow stronger heating of the material in a short interval and at the same time more homogeneous and systematic distribution of the heat introduced into the material.

The specification is accompanied by seven drawings.

Figure 1:
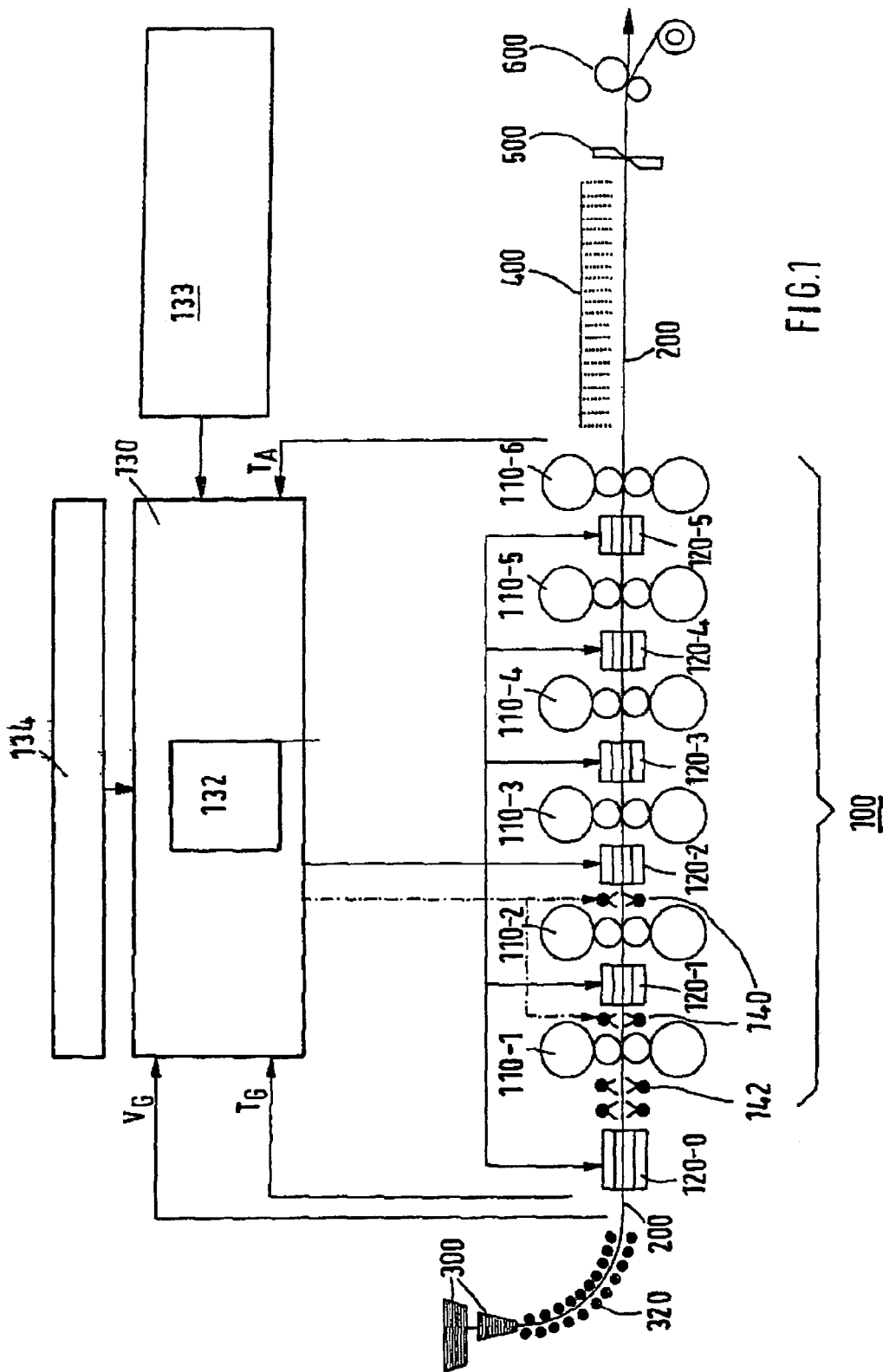
FIG. 1 shows a general view of a slab installation with a finishing train in accordance with the present invention with the components of the control unit (computer model).

The invention is described in detail below with reference to specific embodiments illustrated in the drawings.

FIG. 1 shows a slab installation, which comprises the following units in the direction of material flow (arrow direction): a casting machine 300 for casting a continuous strand, a strand guide system 320 for guiding the continuously cast strand from the vertical to the horizontal, a finishing train 100 for finish rolling the cast strand of starting material to strip material, a cooling line 400 for cooling the finish rolled strip material, a shear 500 for cutting the typically endless strip material, and, finally, one of several coilers 600 for coiling the strip material that has been cut to the desired length by the shear 160.

The finishing train 100 consists primarily of rolling stands 110-*n* (where n=1–N) arranged in succession in the direction of material flow and heaters 120-*k* (where k=1–K) installed between the individual rolling stands 110-*n*. In individual cases, a preheater 120-0 may be installed upstream of the finishing train 100. This is typically the case, for example, when low exit temperatures from the casting machine are to be expected or cooling units 140 are provided between the first rolling stands of the finishing train.

FIG. 1 also shows that the finishing train 100 has an associated control unit 130 for controlling the heaters 120-*k* and the cooling units 140 arranged between the rolling stands. In accordance with the present invention, the control unit 130 is designed not only to turn the aforementioned units on and off but also to allow individual adjustment of the cooling intensity of the cooling units installed between the rolling stands by automatic control of the amount of water they deliver as well as individual adjustment of the amount of heat to be transferred to the rolling stock by the heaters 120-*k*. The decisions about turning the specified units on and off and about the cooling and heating capacities to be adjusted are made by the control unit 130 with the aid of the computer model 132, which considers especially the heat losses within the finishing train to arrive at a decision. These heat losses are primarily the heat losses that occur during the conveyance of the material 200 between successive rolling stands 110-*n* or between successive heaters 120-*k* and during passage through the rolling stands 110-*n*. In addition, to arrive at a proper pass program and to control the specified units, the computer program 132 considers the predetermined mechanical, material-related, or electronic limitations of the rolling stands 110-*n* and the heaters 120-*k* and predetermined limits for the rolling process. Practically speaking, the computer model 132 computes the heat losses on the basis of a large number of predetermined process parameters, for example, the type of starting material that is used, i.e., for example, the type of steel or the type of aluminum used, the thickness of the starting material 200, the casting speed $V_G$, the temperature $T_G$ downstream of the strand guide system 320, the number N of rolling stands in the finishing train 100, the distance between the stands or the distance between the heaters 120, the temperature $T_A$ of the strip material at the exit of the finishing train, the maximum possible cooling capacity of the cooling units 140 between the rolling stands, and predetermined elevated temperature values for the edges of the material, optionally also taking into consideration current temperature values measured between the rolling stands 110-*n*.

The aforementioned limitations considered by the computer model 132 for the rolling stands, the heaters and the cooling units installed between the rolling stands are symbolized in FIG. 1 by reference number 133, while the process-dependent parameters for the type of material used or the thickness of the starting material, the casting speed, etc., are symbolized by reference number 134.

Figure 2:
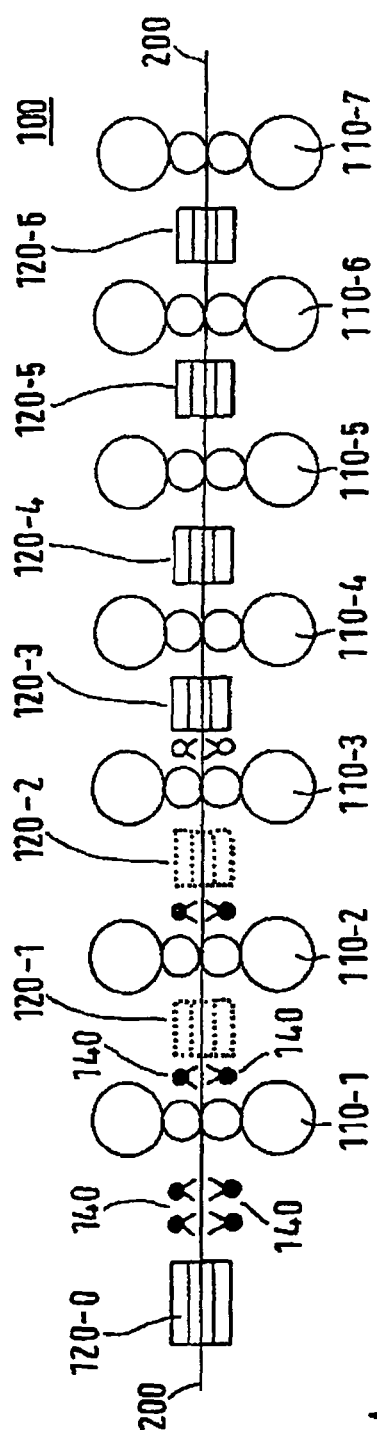
FIG. 2 shows the method of the invention.
Figure 2:
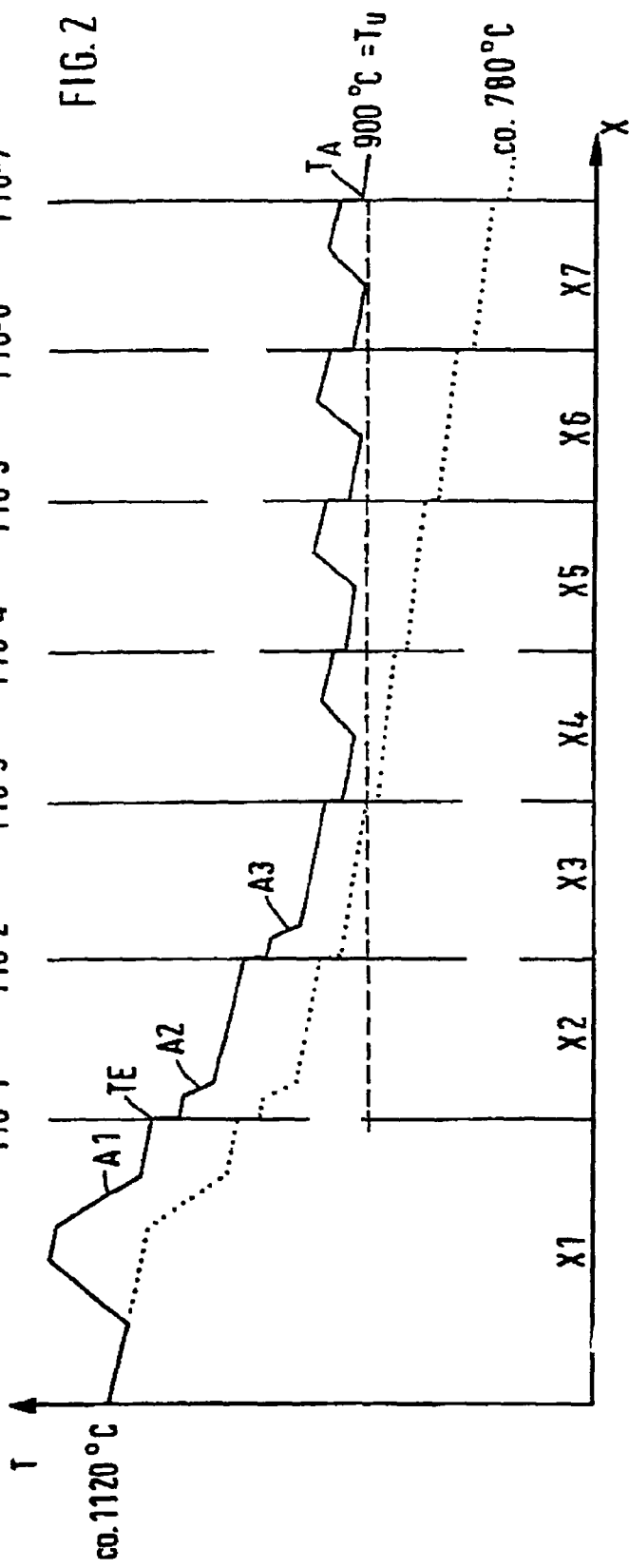

FIG. 2 illustrates the method of the invention for hot rolling the starting material with the finishing train 100 that has just been described.

The method is especially well suited for starting material 200 in the form of thin slabs with a thickness of 120 to 50 mm or in the form of near-net strip. When they are conveyed into the finishing train 100, these starting materials are heated, in accordance with the conditions of the invention, to a run-in temperature $T_E$ above a predetermined lower temperature threshold value $T_U$. The lower temperature threshold value $T_U$ is predetermined as a function of the material. For example, this threshold value is set at about 900° C. for austenitically rolled steels and at about 800° C. for ferritically rolled steels. The starting material 200 is then finish rolled to strip material in the several successive rolling stands 100-1 thru 100-7, and during this process, the starting material cools relative to the run-in temperature $T_E$ due to heat losses within the finishing train. The graph of the mean temperature T of the material as it passes through the finishing train 100 is shown in FIG. 2. In this graph, the heat losses of the material are basically represented by graph segments with a negative slope, while the supply of heat by each of the heaters is represented by graph segments with a positive slope. The sharply decreasing segments A1, A2 and A3 within the line sections X1, X2 and X3 can be attributed to an activation of the descaling unit 142 and the cooling units 140 between the rolling stands; it is advantageous to turn these units on to achieve an especially good surface quality of the rolled material.

FIG. 2 further shows that the heat loss, i.e., the temperature drop, of the material is especially great as the material passes through the rolling stands 110. This is apparent from the discontinuity in the temperature curve at each rolling stand in the graph in FIG. 2. The reason for these sharp drops in temperature is that the material gives off a great deal of heat to the work rolls as it passes through the rolling stands.

The dotted line shown in FIG. 2 represents the temperature curve of the material in the direction of material flow within the finishing train without activation of any of the heaters 120-$k$ between the rolling stands, i.e., without the use of the method of the invention. The final rolling temperature that develops is too low for austenitic rolling and is below the temperature threshold value $T_U$. By contrast, the solid black curve shows the temperature behavior of the material when the method of the invention is used. This method provides that, as seen in the direction of material flow, first a determination is made of that heater at which or downstream of which the temperature of the material 200 threatens to fall below the lower temperature threshold value $T_U$ for the first time due to heat losses. This lower temperature threshold value Tu is indicated in FIG. 2 by a horizontal broken line and is set, for example, at 900° C. In FIG. 2, the solid black curve threatens to drop below this lower temperature threshold value Tu for the first time between the rolling stands 110-3 and 110-4, i.e., in the zone X4, if this drop which threatens to occur is not compensated in advance. A compensation of this type is precisely what is provided for by the method of the invention, in which the temperature of the material is increased by the heater 120-3 installed in this positional X4 in order to prevent the temperature from dropping below the lower temperature threshold value. However, the temperature is not increased arbitrarily in this zone but rather only to the extent necessary in regard to minimizing the amount of energy supplied, i.e., only to the extent that the temperature of the material during the further conveyance of the material within the rolling train as far as the next heater downstream in the direction of material flow, in this case, heater 120-4, drops only as low as the lower temperature threshold value Tu due to the given local heat losses in the finishing train but nor below this threshold value. In the next downstream heater 120-4 and in all further downstream heaters 120-5, 120-6 within the finishing train 100, the heating of the material in accordance with the invention, as described above, is then repeated in each case, so that at the exit of the finishing train 100, the finish rolled strip material 200 has a temperature at the level of the desired final rolling temperature $T_A$, i.e., approximately at the level of the predetermined lower temperature threshold value $T_U$. In contrast to the situation with the heaters 120-3, 120-4, and 120-5 within the finishing train 100, the amount of heat to be applied by the last heater 120-6 of the finishing train can be set somewhat lower, because this heater no longer has to compensate the heat losses between the last rolling stand 110-7 and a (nonexistent) downstream heater.

In the embodiment shown in FIG. 2, the heaters 120-1 and 120-2 within the finishing train are shut off, because a cooling operation is being carried out there between the rolling stands for the sake of an improved surface of the material. The method of the invention for controlling the heaters is thus used only with the heaters 120-3 to 120-6 in FIG. 2. The preheater 120-0 is used to heat the material 200 to a sufficiently high temperature that the temperature of the material as it passes through the descaling unit 142 and the cooling units 140 between the rolling stands, i.e., as it passes through the positional zones X1, X2 and X3, does not drop below the lower temperature threshold value $T_U$.

Figure 3:
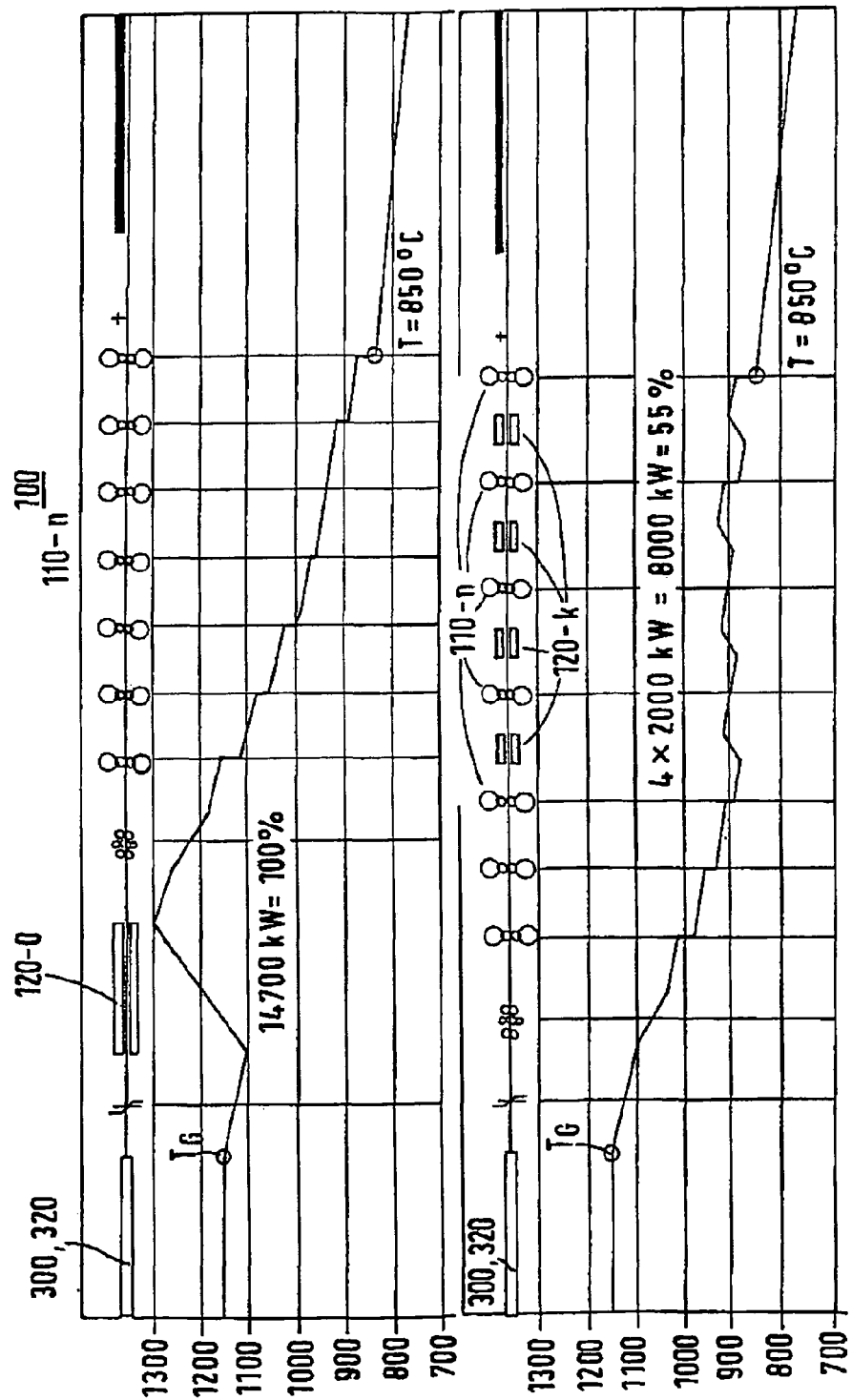
FIG. 3 illustrates the efficiency of the method of the invention compared to a prior-art method.

FIG. 3 illustrates the energetically more favorable manner of operation of the method of the invention compared to a prior-art method. The prior-art method is shown in the upper half of FIG. 3 and provides that the material, starting from a temperature $T_G$ of 1,150° C. at the outlet of the casting machine 300 or of the strand guide system 320, is heated in a preheater 120-0 sufficiently high that during the subsequent passage through the entire finishing train 100 with no reheating within the finishing train, it does not fall below a final rolling temperature of 850° C. at the exit of the finishing train 100. In this example, a power input of 14,700 kW is required for the described heating of the material in the preheater 120-0.

On the other hand, the temperature curve obtained in accordance with the method of the invention is shown in the lower half of FIG. 3. With the same boundary conditions and starting from the same temperature $T_G$ of 1150° C. at the outlet of the casting machine 300 or of the strand guide system 320, the method of the invention also leads to the desired final rolling temperature of 850° C. at the exit of the same finishing train 100. In contrast to the upper graph, in the lower graph there is no preheating of the material before it enters the finishing train, but rather the material is repeatedly reheated in accordance with the method of the invention by means of the heaters 120-$k$ between the rolling stands 110-$n$. As is shown in the lower graph, to obtain the same final rolling temperature at the outlet of the rolling train with the method of the invention, heat must be supplied only in the amount of 8000 kW, which is only 55% of the thermal energy that must be supplied in the prior-art method described above.

Figure 4:
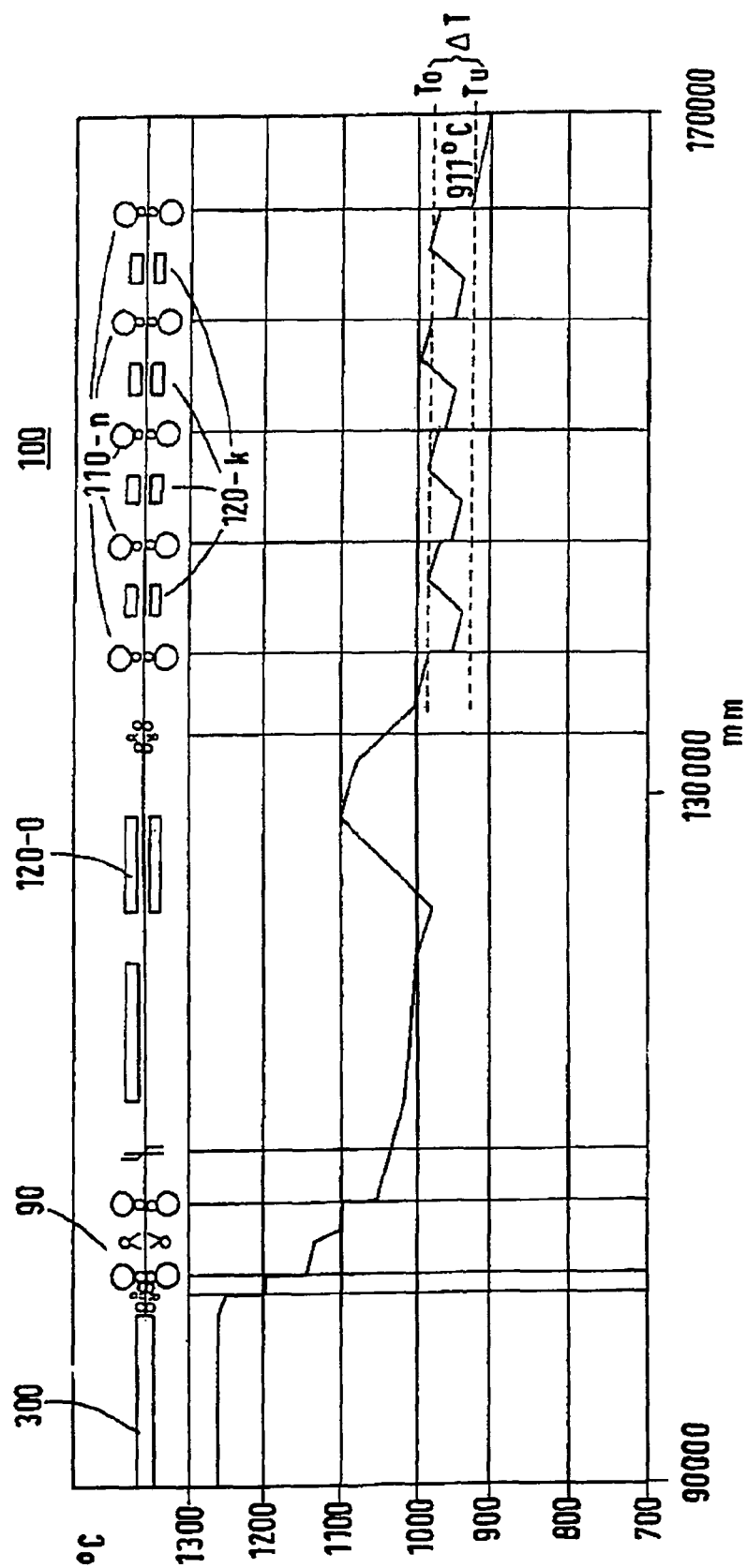
FIG. 4 shows a variation of the method of the invention.

FIG. 4 shows a rolling train that comprises the roughing train 90 and the finishing stands 110-$n$. Inductive heaters 120-0, 120-$k$ are installed between the roughing train and the finishing train and within the finishing train. The inductive heater 120-0 upstream of the finishing train is used to preset the run-in temperature in order to be able to react to various changes in boundary conditions (casting temperature or speed) and in this way to be able to maintain the run-in temperature into the finishing train 110-$n$ at a constant level, which helps the method presented here.

FIG. 4 also shows a variant of the method of the invention, in accordance with which the temperature during the reheating of the material by the heaters 120-$k$ is limited by a predetermined upper absolute temperature threshold value $T_O$. In this variant of the method of the invention, the temperature of the material within the finishing train 100 during the repeated reheating of the material in accordance with the invention then varies only within a target temperature range $\Delta T$ formed by the difference between the upper and the lower temperature threshold values. Quasi-isothermal rolling of the material then takes place; an example of this type of target temperature range is shown graphically in FIG. 4.

Figure 5:
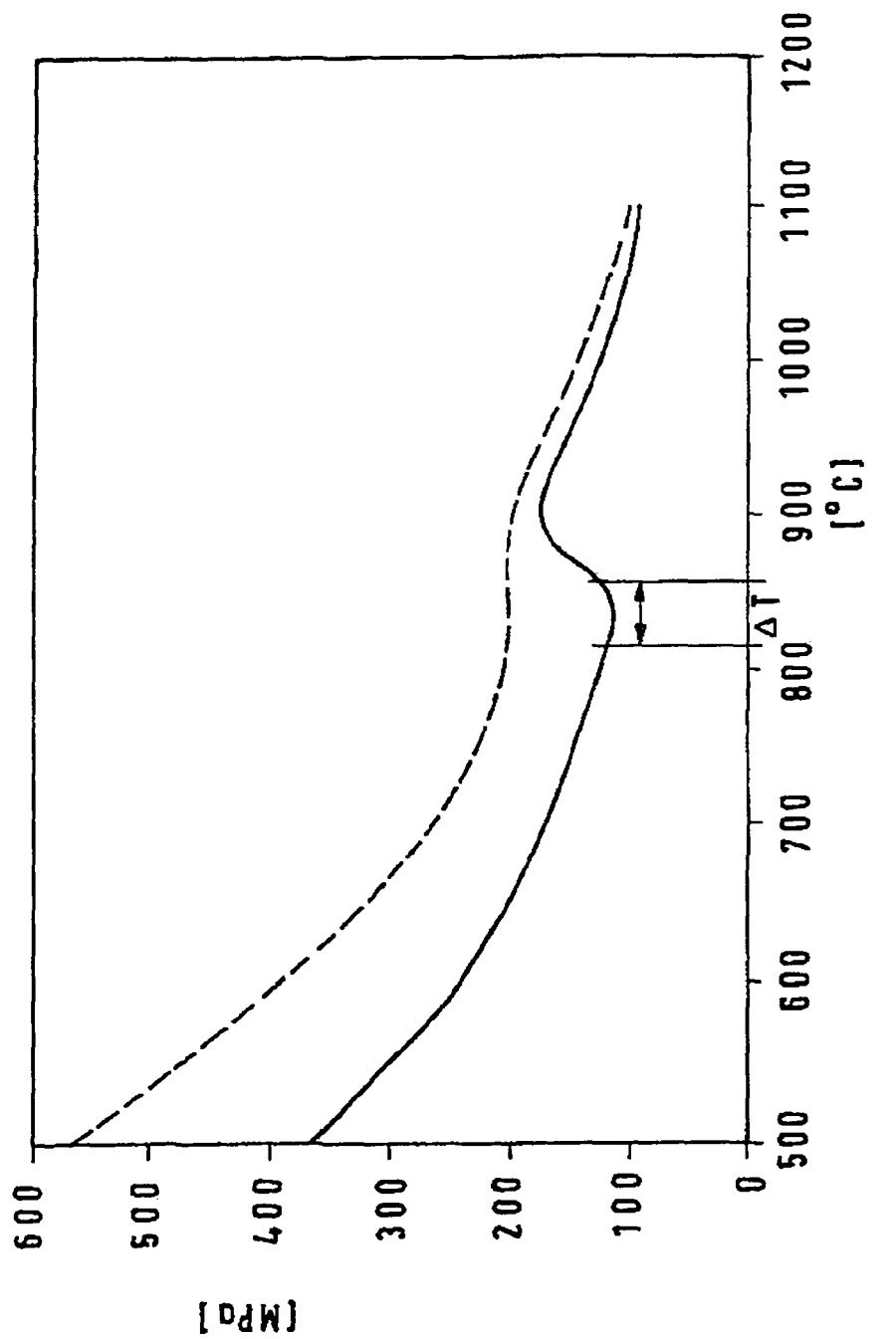
FIG. 5 shows the curve of the mean hot flow strength for different steels as a function of temperature.

The target temperature range $\Delta T$ is also preferably selected in such a way that the given material being used has good material properties and/or the best possible deformability in this target temperature range. This kind of especially good deformability is exhibited by a material, for example, where, mathematically speaking, the curve of its mean hot flow strength as a function of temperature has a local minimum. FIG. 5 shows the curves of mean hot flow strength as a function of temperature for two different types of steel; the broken curve represents the hot flow strength for a standard C steel, and the solid curve represents the hot flow strength for a ULC steel. It is apparent that the solid curve for the ULC steel has a local minimum in the region of about 820 to 860° C., which can be utilized by this method in a positive way in the case of ferritic rolling.

Figure 6:
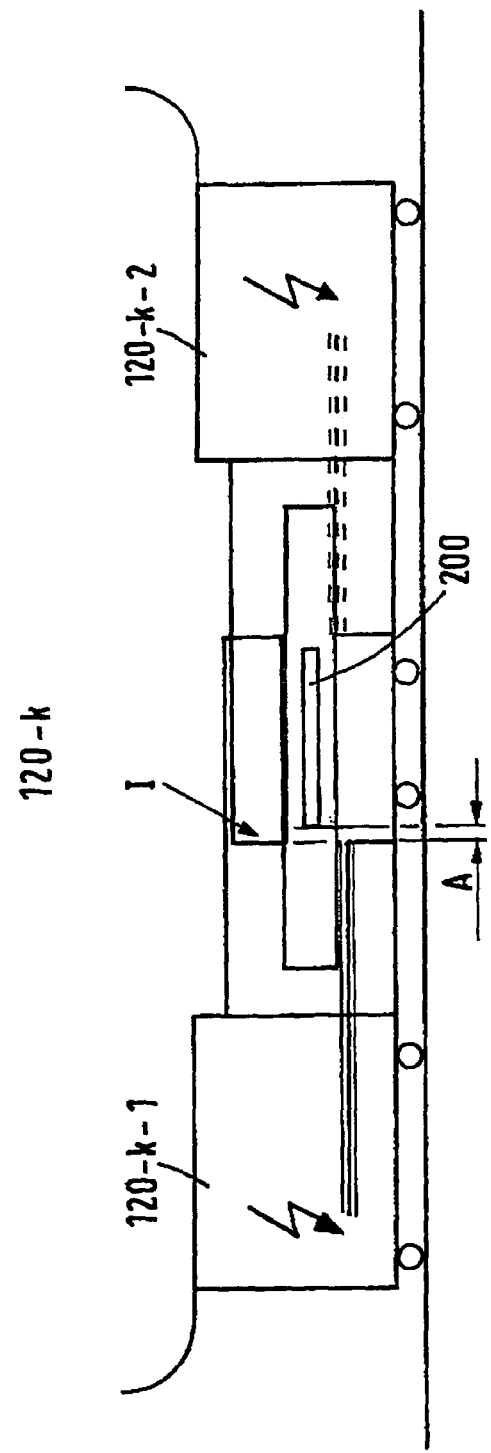
FIG. 6 shows a specific embodiment of a heater positioned along the edge of the strip for reheating the material.

FIG. 6 shows a specific embodiment of an inductive heater 120-k. The heater is constructed in two parts with an inductor 120-k-1 on an operating side and an inductor 120-k-2 on a motor side. The two inductors are run in, when needed, from the right and the left to overlap in the line of the finishing train, so that, finally, the inductor coils I are positioned over the broad sides of the material 200. The heads of the inductors are adjusted in such a way that they are oriented towards the strip edge and are arranged in succession as pairs. In this regard, positioning with orientation towards the strip edge means that the inductor heads are set beyond the width of the material, for example, with a distance A from the edge of the material.

Figure 7:
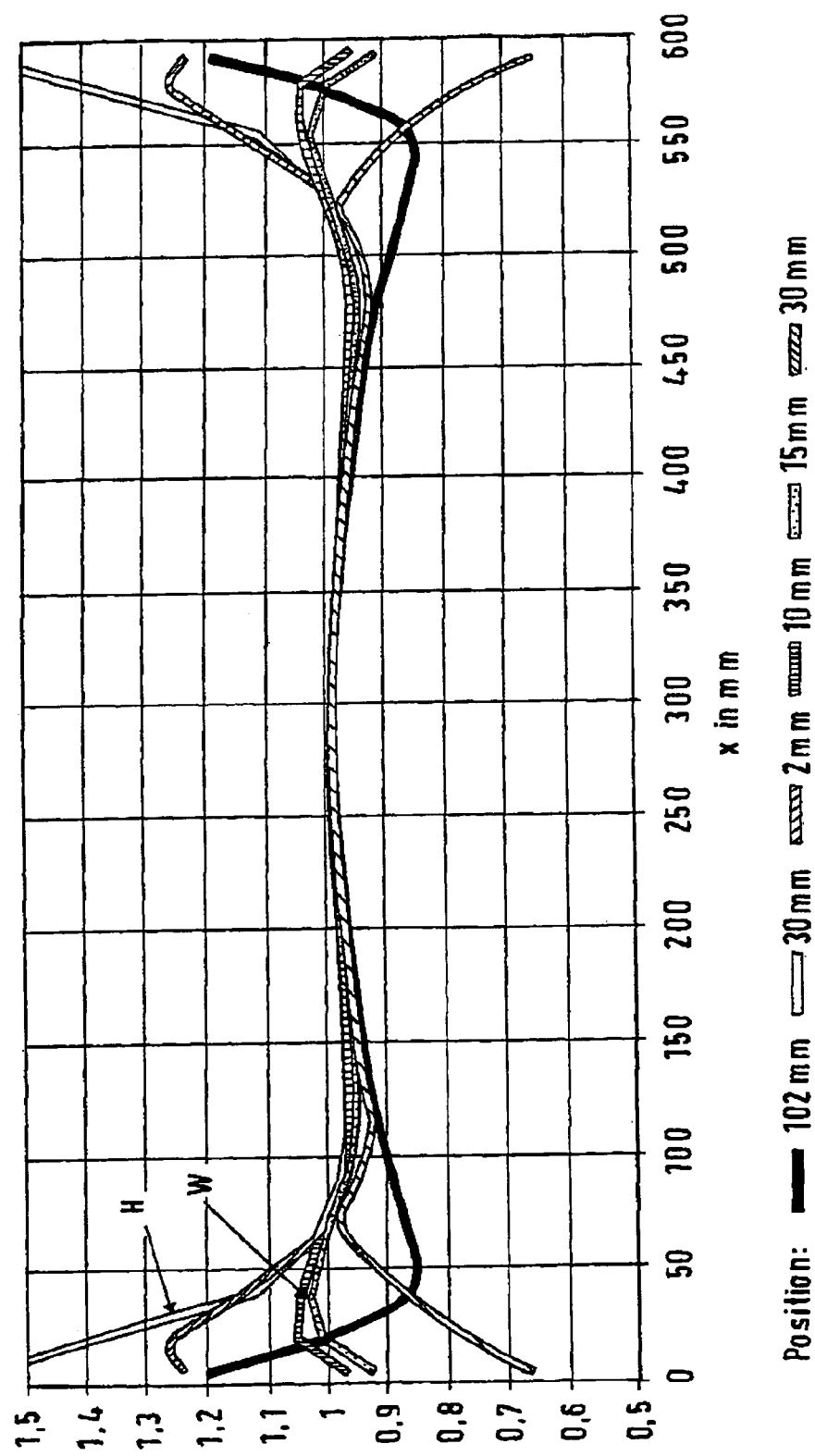
FIG. 7 shows various temperature curves over the width of the material with varying strip edge temperature; these temperature curves represent the heat distribution to be transferred to the material by a heater.

In accordance with the invention, the heaters 120-k are then controlled in such a way by the control unit 130 that a distribution of the heat supply over the width of the material, i.e., transverse to the direction of material flow is obtained, as seen, for example, in FIG. 7, which shows that transverse-field heating is realized at the edges of the material due to suitable control of the heaters and their positioning with orientation towards the strip edge, with the characteristic feature that the edges of the material are heated relatively more intensely than the center of the material; see curve H in FIG. 7. Taking into account the especially intense cooling of the edges of the material before it enters the finishing train, relatively uniform heat distribution over the width of the material is then obtained when the material leaves the finishing train. On the other hand, the behavior of curve W in FIG. 7 shows relatively uniform heating of the material over the width. In FIG. 7, the effect or the ratio of the strip edge temperature to the strip center temperature over the width of the material 200 transverse to the direction of material flow is plotted for various positions A of the inductor heads.

The targeted inductive adjustment of the strip edge temperature within the finishing train can be used additionally or alternatively to the control of the strip flatness and the strip profile. Especially in the case of austenitic special steels, control of the strip edge temperature and thus the strip shape is possible within a large range. The effects are described in a profile, contour and flatness model, and the position of the inductive heaters is systematically used as a function of predetermined model values.

The invention claimed is:

1. A method for hot rolling starting material (200) in a finishing train (100), which comprises the following steps:
introducing the starting material (200), which is heated to a run-in temperature ($T_E$) above a predetermined lower temperature threshold value ($T_U$), into the finishing train;
rolling the heated starting material (200) in several successive rolling stands (110-n) of the finishing train to form strip material, where the starting material undergoes cooling from the run-in temperature ($T_E$) due to heat losses in the finishing train (100); and
compensating for the heat losses by reheating the material between at least some of the successive rolling stands (110-n) of the finishing train by using heaters (120-k) arranged between the rolling stands of the finishing train (100), to an extent that the temperature within the rolling train and the final rolling temperature ($T_A$) of the strip material when it leaves the finishing train (100) are not below the predetermined lower temperature threshold value ($T_U$);
the compensating step including determining a first of the heaters, relative to a direction of material flow, at which or downstream of which the temperature of the material threatens to fall below the lower temperature threshold value ($T_U$) for a first time due to heat losses; then reheating the material so that the temperature of the material is increased by the first heater (120-k) only to an extent that the temperature falls to the lower temperature threshold value ($T_U$) due to given local heat losses in the finishing train during further conveyance of the material to a next heater downstream (120-[k+1]) of the first determined heater, as seen in the direction of material flow, or if there is no further heater downstream in the direction of material flow, the temperature of the material is increased to a point at which the material leaves the finishing train (100); and repeating the reheating of the material by each additional downstream heater within the finishing train, as viewed in the direction of material flow.

2. A method in accordance with claim 1, wherein the temperature of the material during the reheating within the rolling train is not raised above a predetermined upper temperature threshold value ($T_O$), which is above the lower temperature threshold value ($T_U$), and thus remains in a target temperature range ($\Delta T$) between the upper and lower temperature threshold values.

3. A method in accordance with claim 2, wherein the target temperature range ($\Delta T$) is selected in such a way that, depending on the type of material that is being used, a curve of a mean hot flow strength as a function of temperature for the material that is being used mathematically has a local minimum in the target temperature range.

4. A method in accordance with claim 1, wherein the lower temperature threshold value ($T_U$) is predetermined according to the material that is being used and is set for low carbon austenitically rolled steels to about 900° C. and for ferritically rolled steels to about 800° C.

5. A method in accordance with claim 1, including selectively heating the starting material (200) by a preheater (120-0) to the run-in temperature ($T_E$) above the lower temperature threshold value ($T_U$) before it is introduced into the finishing train (100).

6. A method in accordance with claim 5, including heating the starting material, when an intermediate cooling (140) of the material (200) takes place between initial of the rolling stands (110-1, 110-2, 110-3) in the direction of material flow, before the starting material is introduced into the finishing train, by the preheater (120-0) to the run-in temperature ($T_E$) that is sufficiently high so that the material, during conveyance through a region of the intermediate cooling (140) between the rolling stands and until the material reaches a next heater (120-3) downstream in the direction of material flow after the region of intermediate cooling between the rolling stands, does not fall below the lower temperature threshold value ($T_U$).

7. A method in accordance with claim 1, including determining a heating level and the first heater at which or downstream of which the temperature of the material threatens to fall below the lower temperature threshold value ($T_U$) for the first time due to heat losses by using a computer model (132) and/or based on measured temperature values from inside the finishing train.

8. A method in accordance with claim 7, wherein the computer model (132) iteratively computes the first heater or an amount of heat to be transferred by each individual heater (120-$k$) to the material (200) either based on a forward computation in the direction of material flow or a backward computation opposite the direction of material flow, which starts from the desired final rolling temperature ($T_A$) of the strip material at the exit of the finishing train (100).

9. A method in accordance with claim 8, wherein the computer model (132) and the determination of the first heater and the amounts of heat individually predetermined for the individual heaters (120-$k$) during a rolling process are adapted to altered process parameters, including a determined altered temperature between two rolling stands.

10. A method in accordance with claim 1, wherein an amount of heat to be transferred to the material as it passes through the finishing train by one of the heaters (120-$k$) in each individual reheating operation is computed in advance, before beginning of the rolling operation, by a computer model (132) that takes into account the heat losses that occur during conveyance of the material between successive rolling stands (110-$n$) or between successive heaters (120-$k$) and during passage through the rolling stands.

11. A method in accordance with claim 10, wherein the computer model (132) computes the heat losses by taking into account predetermined limitations (133) for the rolling stands of the finishing train, for the heaters and for the rolling process based on predetermined process parameters, including a type of starting material used, thickness of the starting material, casting speed, a number of rolling stands in the finishing train, a distance between the rolling stands or a distance between the heaters, measured temperature of the starting material at an outlet of a strand guide system (320) and a measured temperature of the strip material at an exit of the finishing train, optionally a cooling capacity of the cooling units (140) between the rolling stands, and optionally measured temperature values between the rolling stands and/or predetermined increased temperature assignments for edges of the material.

12. A method in accordance with claim 10, wherein the heaters (120-$k$) are positioned with orientation towards a strip edge and are controlled by the computer model (132) so that, viewed transversely to the direction of material flow, a greater amount of heat is supplied to the edges of the material, which are cooled to an above-average extent, than to a center of the material.

13. A method in accordance with claim 12, including using an inductive adjustment of the strip temperature within the finishing train to control strip flatness and strip profile, effects of the inductive adjustment are described in a profile, contour and flatness model, and a position of the inductive heaters is predetermined.

14. A method in accordance with claim 1, wherein the reheating is carried out with inductive heaters (120-$k$).

15. A finishing train (100), which comprises:
a plurality of rolling stands (110-$n$) arranged in succession in a direction of material flow for hot rolling starting material (200) into a strip material, where the starting material (200), which has been heated to a run-in temperature ($T_E$) above a lower temperature threshold value ($T_U$), undergoes cooling due to heat losses in the finishing train (100);
heaters (120-$k$) installed between at least some of the rolling stands (110-$n$); and
a control unit (130) for controlling the heaters (120-$k$) so that the heat losses are compensated by reheating the starting material (200) to an extent that a final rolling temperature ($T_A$) of the strip material after the strip material leaves the finishing train does not fall below the predetermined lower temperature threshold value ($T_U$);
wherein the control unit (130) is operative
(a) to determine a first of the heaters (120-$k$) at which or downstream of which, as seen in the direction of material flow, the temperature of the material threatens to fall below the lower temperature threshold value ($T_U$) for a first time due to heat losses in the finishing train; and
(b) to control the first heater (120-$k$) thus determined and, if necessary, any other of the heaters within the finishing train that are located downstream of the first heater in the direction of material flow in such a way that the material is reheated by each heater only to an extent that the temperature of the material could fall to the lower temperature threshold value ($T_U$) due to the heat losses during further conveyance of the material to a next heater downstream (120-[$k$+1]), as seen in the direction of material flow, or after passing a last heater, the temperature of the material is increased to a point at which the material leaves the last rolling stand (110-$n$) of the finishing train.

* * * * *

UNITED STATES PATENT AND TRADEMARK OFFICE
CERTIFICATE OF CORRECTION

PATENT NO.        : 8,601,851 B2  
APPLICATION NO. : 12/084366  
DATED             : December 10, 2013  
INVENTOR(S)       : Seidel et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1533 days.

Signed and Sealed this
Twenty-second Day of September, 2015

Michelle K. Lee
*Director of the United States Patent and Trademark Office*